Jan. 14, 1958 M. A. DEMEULENAERE ET AL 2,820,106

AUTOMATIC DIALING DEVICE

Filed Oct. 8, 1954 5 Sheets-Sheet 1

INVENTORS.
MARCEL ANTOINE DEMEULENAERE
ROBERT DEMEULENAERE.
BY Ward, Neal, Haselton, Orme & McElhannon
ATTORNEYS.

Jan. 14, 1958 M. A. DEMEULENAERE ET AL 2,820,106

AUTOMATIC DIALING DEVICE

Filed Oct. 8, 1954 5 Sheets-Sheet 2

INVENTORS.
MARCEL ANTOINE DEMEULENAERE
ROBERT DEMEULENAERE.
BY Ward, Neal, Haselton, Orme & McElhannon
ATTORNEYS Jan. 14, 1958 M. A. DEMEULENAERE ET AL 2,820,106

AUTOMATIC DIALING DEVICE

Filed Oct. 8, 1954 5 Sheets-Sheet 3

INVENTORS.
MARCEL ANTOINE DEMEULENAERE
ROBERT DEMEULENAERE.
BY Ward, Neal, Haselton,
Orme & McElhannon
ATTORNEYS.

AUTOMATIC DIALING DEVICE

INVENTORS
MARCEL ANTOINE DEMEULENAERE
ROBERT DEMEULENAERE
BY Ward, Neal, Haselton, Orme & McElhannon
ATTORNEYS.

AUTOMATIC DIALING DEVICE

Filed Oct. 8, 1954

5 Sheets-Sheet 5

INVENTORS.
MARCEL ANTOINE DEMEULENAERE
ROBERT DEMEULENAERE.
BY Ward, Neal, Haselton, Orme & McElhannon
ATTORNEYS.

United States Patent Office 2,820,106

Patented Jan. 14, 1958

2,820,106

AUTOMATIC DIALING DEVICE

Marcel Antoine Demeulenaere and Robert Demeulenaere, New York, N. Y.

Application October 8, 1954, Serial No. 461,237

Claims priority, application Belgium October 10, 1953

10 Claims. (Cl. 179—90)

This invention relates to a device for actuating the dial of a telephone instrument forming part of a dial telephone system and particularly to a device which, upon one actuation of a single key, will rotate the dial of a telephone instrument in the manner necessary to place a call to a desired party.

Telephone instruments for use with automatic telephone switching equipment are well known and such instruments, in addition to a hand set, have a manually operable dial which, after the hand set has been removed and dial tone has been received, is manually actuated a plurality of times in succession to place a call to a desired party. Manual operation of such a dial is not only time-consuming but also tedious if it must be performed frequently.

It frequently occurs that the user of a dial telephone instrument places many calls to one or more of several parties. In this situation, it is possible to provide a device which upon one operation of a single key, knob, etc., actuates the dial of the instrument in the manner necessary to place the call to the desired party. Such a device usually employs an electrically driven motor and a control mechanism which is set into operation by the aforementioned key, knob, etc.

Although dialing devices of the type described above are known in the art, many of such devices are complex, relatively large in size, and expensive to make. In addition, it is relatively difficult to set up the control mechanism so that actuation of the key, knob, etc., will cause the proper actuation of the dial of the telephone instrument. This problem is particularly serious when it is desired to change from time to time the set up of the control mechanism so that parties different from those for which the device was originally set may be called.

The dialing device of the present invention is of the general type described above. However, the dialing device of the present invention is an improvement over the dialing devices previously known and is not only relatively simple in structure and operation, but also is simple and inexpensive to manufacture. In addition, the control mechanism may be easily set up or changed by an unskilled operator, the mechanism being set merely by moving a single arm or lever, by inserting a locking rod in the proper position in the apparatus, by loosening the head of the dialing button, by removing the locking rod and depressing the button, by manually operating an auxiliary dial in the manner usually employed to manually dial a party, by then reinserting the locking rod and tightening the button and finally by removing the locking rod and returning the abovementioned arm to its normal position. After the setting of the mechanism as aforesaid, the device may be used to dial a desired party by merely depressing the button which has been set.

It is also an advantage of the device of the present invention that the parts associated with the button and which control the operation of the device can be set without having previously modified the previous setting of the parts such as by returning the parts to a predetermined position. In addition, the parts associated with a button may be set to cause subsequent dialing of a number having any number of letters or digits up to a maximum number depending upon the construction of the device. Thus, in the device described herein the parts may be preset for the subsequent dialing of any telephone number having up to and including nine letters or digits. Thus, one button may be set to dial a telephone number having a total of two letters or digits, another button may be set to dial a telephone number having a total of five letters or digits, etc.

The invention may be better understood by referring to the following detailed description setting forth the manner in which we now prefer to practice the invention and to the accompanying drawings, in which:

Figure 1 is a plan view of a dialing device constructed in accordance with the invention and showing only certain parts of the device, such as the calling dial, calling buttons, a commutator plate and some of the transmission systems controlled by the calling buttons;

Figure 1' is a fragmentary plan view and shows a detail of the mounting of the dial shown in Fig. 1 on its shaft;

Figure 2 is a vertical cross-sectional view of the device shown in Fig. 1 with certain parts omitted for clarity of illustration and is taken along the line II—II indicated in Figure 1;

Figure 2' is an enlarged, plan view of certain of the parts shown in Fig. 2 and certain of the parts shown in Fig. 6;

Figure 2'' is a vertical cross-sectional view of modified elements which may be substituted for some of the elements shown in Figure 2;

Figure 2''' is a vertical cross-sectional view of modified elements which may be substituted for some of the elements shown in Fig. 2;

Figures 2, 3:
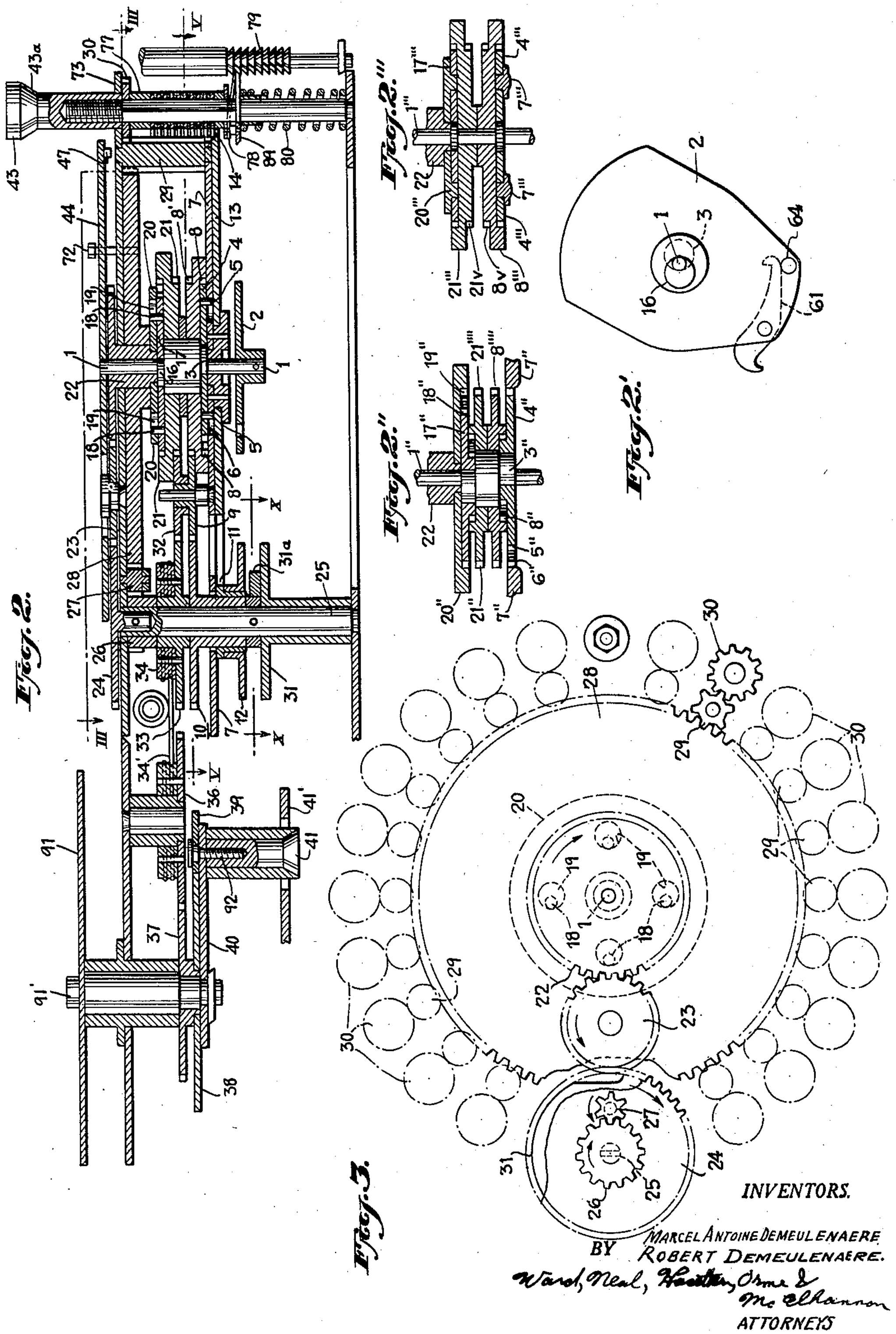
Figure 3 is a horizontal cross-sectional view of a portion of the device shown in Fig. 2, certain elements being omitted, and is taken along the line III—III indicated in Fig. 2.
Figures 4, 8, 9, 13:
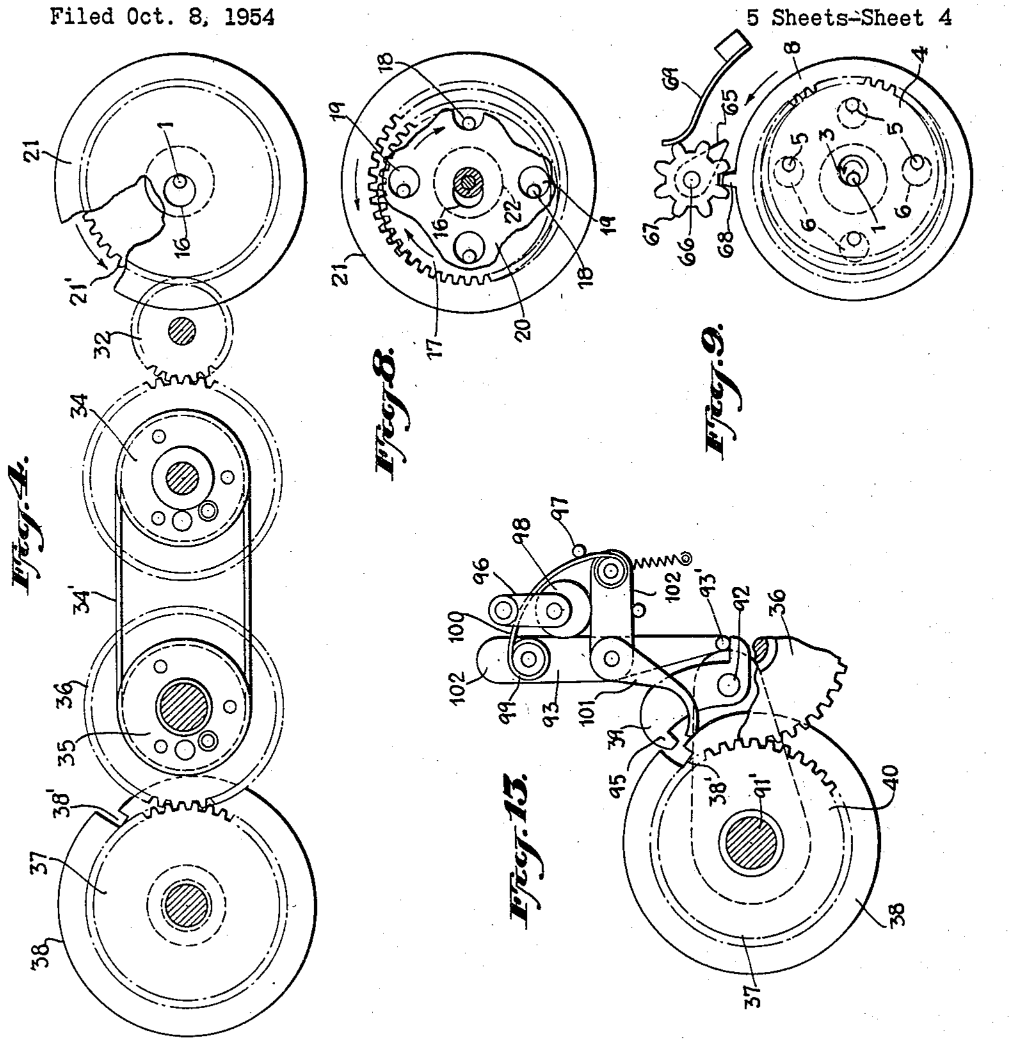
Figure 4 is a horizontal cross-sectional view of a gear train forming part of the device and is taken along the line IV—IV indicated in Fig. 2.
Figure 8 is a plan view of the differential shown in Fig. 2 for driving the buttons and the dial.
Figure 9 is a plan view of the differential shown in Fig. 2 driving the switching and setting elements.
Figures 10, 11, 12:
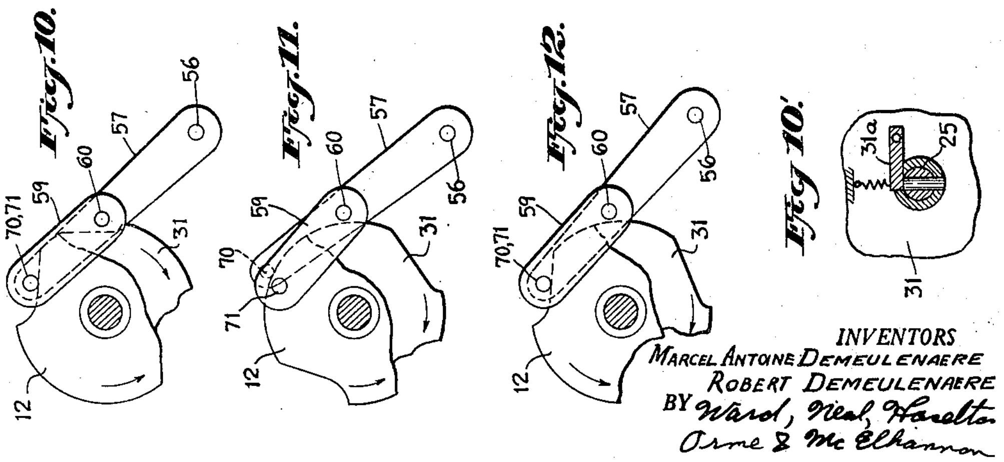
Figure 10 is a plan view, in one position, of the timing cams shown in Fig. 2 and certain associated parts.
Figures 14, 17, 18, 19, 20, 21, 22, 23, 24:
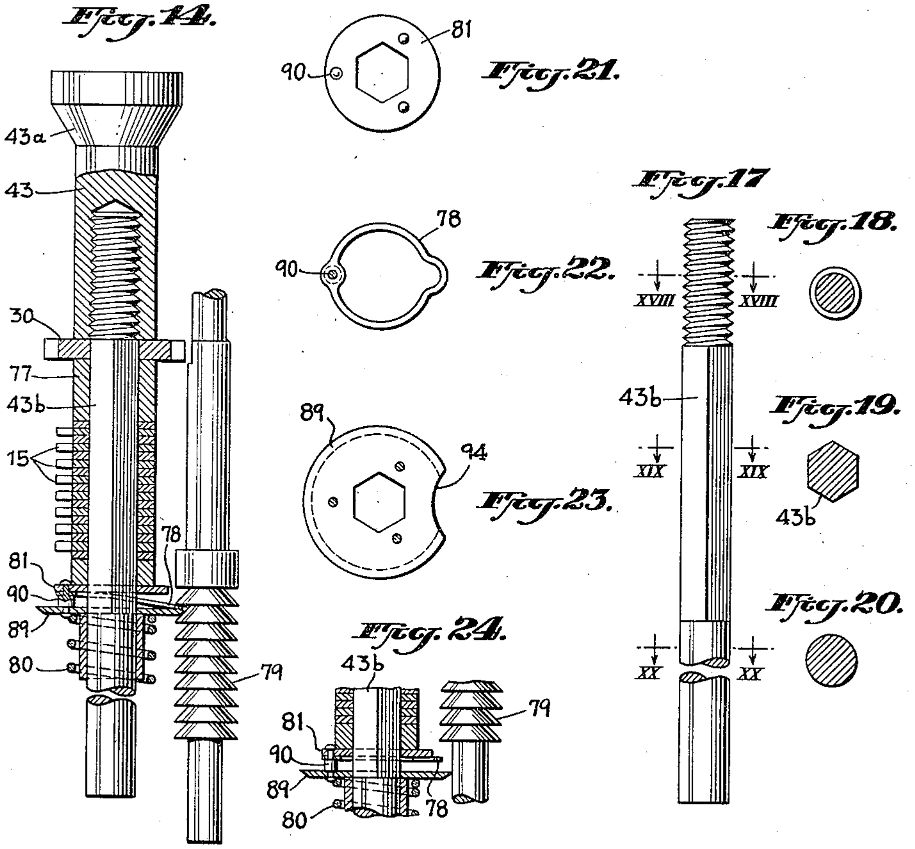
Figure 26:
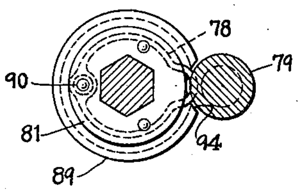
Figure 15:
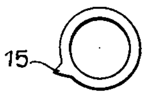
Figure 25:
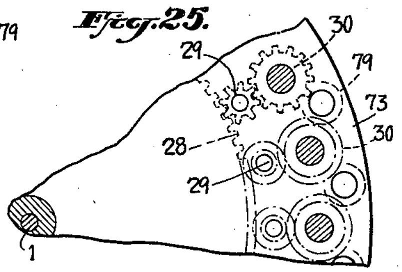
Figure 16:
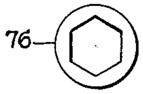
Figure 27:
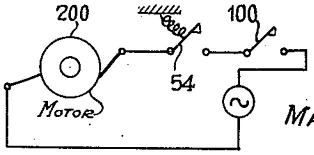

Figure 10' is a cross-sectional view taken on the line X—X of Fig. 2, and showing the connection of a cam with a shaft which it surrounds;

Figures 11 and 12 are plan views which show two other positions of the cams and parts shown in Fig. 10;

Figure 13 is a plan view of a mechanism for disconnecting the telephone dial from the automatic dialing mechanism;

Figure 14 is a side elevation view, partly in cross section and shows a button and escapement bar to a much larger scale than Fig. 2;

Figure 15 is a plan view of a stop which is mounted on a button;

Figure 16 is a plan view of a plastic friction washer which is also used on a button;

Figure 17 is a side elevation view showing the rod forming part of a button;

Figures 18, 19 and 20 are respectively transverse sections on the lines XVIII—XVIII, XIX—XIX and XX—XX of Figure 17;

Figures 21, 22 and 23 are plan views showing parts of an escapement mechanism which is mounted on a button;

Figure 24 is a fragmentary, side elevation view, partly in cross-section and shows the lowest position of the escapement mechanism of a button;

Figure 25 is a fragmentary plan view and illustrates a part of the button driving mechanisms;

Figure 26 is a sectional plan view of the parts shown in Fig. 14 and is taken along the line XXVI—XXVI of Fig. 14; and Figure 27 is a circuit diagram showing the manner of supplying power to the electric motor which operates the device.

GENERAL DESCRIPTION

The operation of the arrangement which has been illustrated may be briefly described as follows:

A central shaft 1 (Figs. 1 and 2) is provided with two eccentrics 3 and 16 (Fig. 2) and is driven intermittently by a motor which is not shown in these figures. The number of times that the central shaft 1 may be set in rotation is equal to the number of letters and/or digits contained in the largest telephone number which the device is able to call. For example, if the largest number to be called comprises nine digits, the central shaft 1 must be capable of being set in rotation and being stopped nine times in order to cause the automatic calling of this number. However, if it is desired by means of the same arrangement to call a number comprising fewer digits, for example, three digits, the central shaft 1 is set in rotation and is stopped for this call only three times.

The expression "telephone number" is used in its general sense as meaning a combination of letters and digits representing the operation of a telephone instrument dial required to establish a wire connection with a desired party. Of course, the number may consist entirely of digits or entirely of letters, but the exact nature of the number is unimportant since the control mechanism of the dialing device is set up so as to perform the necessary dialing operations whenever a key is depressed.

In the case of the arrangement described, the number of revolutions carried out by the central shaft 1 each time it is set in rotation is equal to twelve. Each of the aforesaid two eccentrics (3 and 16) drives a differential planetary mechanism.

Of the two differentials, the one which is lowest (the one driven by the eccentric 3), drives a gear train which serves to control the operations of the device and switch over the control from digit to digit and which is referred to as the "setting gear train." The differential positioned at the higher level (the one driven by the eccentric 16) drives two gear trains which are respectively referred to as "button or key gear train" and "dial gear train." The buttons or keys are designated by the numeral 43. When these buttons 43 are depressed against the action of a spring 80 (Fig. 2) they serve to control the calling of the telephone numbers to which they correspond. The device which is illustrated comprises twenty buttons 43, because it is capable of calling twenty telephone numbers. In each period of twelve revolutions of the shaft 1, the upper differential rotates the buttons for only a fraction of a revolution until the depressed button is stopped in a position which corresponds to the digit to be dialed and which has been determined at the time of setting of the button. Let it be supposed in one particular case that this rotation of the buttons is three twelfths of a revolution. When the button is stopped, the dial train is driven through an angle equal to the remaining nine twelfths of a revolution. Briefly stated, the rotation of the button and the rotation of the telephone instrument dial always together represent twelve twelfths of a revolution. In other words, the rotation of the buttons and that of the dial represent the complementary twelfths of one revolution. The manner in which the button stops are prearranged in the required position and how the operations of the machine are regulated in sequence will be hereinafter described.

*Setting gear train operation*

Figure 7:
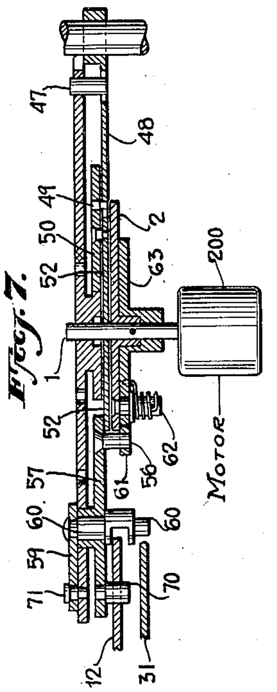
Figure 7 is a vertical cross-sectional view of the mechanism shown in Fig. 6 and is taken along the line VII—VII indicated in Fig. 6.

The central shaft 1, to the lower part of which is fixed a plate 2 (Figs. 2, 2' and 6), is driven during twelve revolutions of the driving motor 200 (Fig. 7) in a manner which will be subsequently described. Mounted on the eccentric 3 (Figs. 2 and 9) is a toothed planet wheel 4. This wheel 4 carries four rods 5 which extend into four holes 6 formed in a plate 7 which is fixed in relation to the frame of the device. The toothed wheel 4 has sixty-six teeth which mesh with an internally toothed wheel 8 which has seventy-two teeth. When the eccentric 3 turns, the toothed planet wheel 4 meshes with the internal teeth of wheel 8 and each rod remains in contact with the contour of its associated hole 6. When the eccentric 3 has completed one revolution, the toothed planet wheel 4 has returned into the position shown in the drawing. During this revolution, the rods 5 of the toothed planet wheel 4 have followed the contour of the holes 6. This contour accurately follows the eccentricity of the eccentric 3 in such manner that the toothed planet wheel 4 may follow the rotation of the eccentric without itself turning with respect to its true centre. When the toothed planet wheel 4 returns to the position in the drawing after one revolution, its sixty-six teeth have been in mesh with the seventy-two teeth of the internally toothed wheel 8. This latter has been advanced by seventy-two teeth less sixty-six teeth, which equals six teeth, and this corresponds to one twelfth of a revolution. The internally toothed wheel 8 has therefore carried out one twelfth of a revolution.

Figure 5:
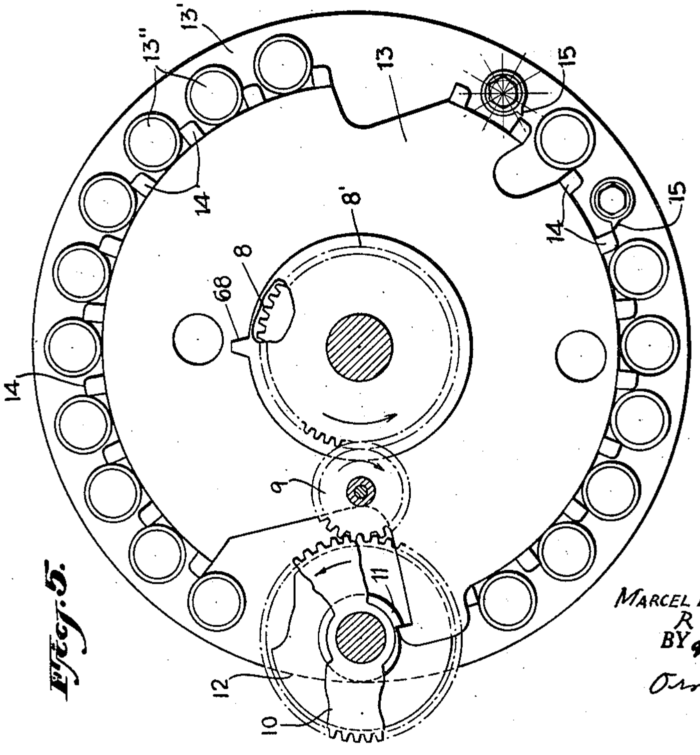
Figure 5 is a horizontal cross-sectional view of a portion of the device shown in Fig. 2, certain elements not being shown, and is taken along the line V—V indicated in Fig. 2.

After twelve revolutions of the eccentric 3, the internally toothed wheel 8 has carried out one revolution. This wheel is provided on its upper part with an external toothing 8' which also has seventy-two teeth (Fig. 5). It transmits its rotation by means of a toothed idler wheel 9 to a toothed wheel 10 which also has seventy-two teeth and which thus completes one revolution for twelve revolutions of the eccentric 3. The toothed wheel 10 rotates cams 11 and 12 (Figs. 2 and 5). A plate 13 (Figs. 2 and 5) is held by means of a spring (not shown) against the cam 11. The plate 13 is provided with as many projections 14 as there are calling buttons, so that there are 20 of these projections. When the cam 11 commences one revolution, the plate 13 is immediately set in rotation in a counter-clockwise direction in such manner that one of the projections 14 is positioned on the path of a stop 15 (Figs. 5, 14 and 15) carried by the depressed button 43. This stop has been shown only for two of the buttons in Fig. 5. On completion of the revolution of the cam 11, the plate 13, returns to the position shown in the drawing and frees the button, the rotation of which has been stopped. The operation of the cam 12 will be hereinafter described.

In order better to understand the operation, it is to be noted that when the eccentric 3 has completed one revolution, the internally toothed wheel 8 has turned $$1 \text{ revolution} \times \frac{4 \text{ teeth}}{4 \text{ teeth}} \times \frac{66 \text{ teeth}}{72 \text{ teeth}} = \frac{11}{12} \text{revolution}$$

relatively to the eccentric 3, or 1/12 revolution relatively to the device in the same direction as the eccentric 3 and the shaft 1.

*Button gear train operation*

The central shaft 1 has a second eccentric 16 which drives a toothed planet wheel 17 (Fig. 2). This latter wheel has four rods 18 similar to the rods 5 and engage in four holes 19 (Figs. 4 and 8) similar to the hole 6 and formed in a plate 20. The plate 20 is provided for driving the button gear train.

Let us consider the differential shown in Figure 8. The planet wheel 17 has sixty-six teeth and meshes with an internally toothed wheel 21 having seventy-two teeth. If the latter is kept stationary during the rotation of the eccentric 16, the latter causes the sixty-six teeth of the toothed planet wheel 17 to mesh with the seventy-two teeth of the internally toothed wheel 21 and maintains each rod 18 in contact with the contour of its hole 19. Since the internally toothed wheel 21 is held stationary by a spring (not shown), as well as by the conventional spring of the telephone dial, as will hereinafter be explained, the toothed planet wheel 17 is driven in a clockwise direction in the ratio of six teeth per revolution of the eccentric 16 (this is exactly the opposite of that which is produced in the differential described above and shown in Fig. 9). It follows that for twelve revolutions of the eccentric 16, the toothed planet wheel 17 turns in a clockwise direction for seventy-two teeth. As the toothed planet wheel 17 has sixty-six teeth, it is turned for sixty-six teeth plus six teeth, or one revolution plus 1/11 revolution. Owing to the rods 18 of the toothed planet wheel 17, the plate 20 which turns about the central shaft 1 follows the rotation of one revolution plus 1/11 revolution of the planet wheel 17.

As shown in Figures 2 and 3, the plate 20 is connected so as to drive a toothed wheel 22. The latter has sixty-six teeth. For twelve revolutions of the eccentric 16, the toothed wheel 22 completes one revolution plus 1/11 revolution, this corresponding to seventy-two teeth. It transmits this rotation by means of a toothed idler wheel 23 to a toothed wheel 24 which is fixed on a shaft 25. As the toothed wheel 24 has seventy-two teeth, it makes one revolution for twelve revolutions of the central shaft. A gear 26 which has twelve teeth is also fixed on the shaft 25. The gear 26 meshes with a gear 27 which meshes with a large central toothed wheel 28. The latter transmits its rotation to toothed rods 29 which mesh with toothed wheels 30 keyed to the buttons. The wheels 30 have the same number of teeth as the toothed wheel 26, that is to say, twelve teeth.

The effect of this button gear train may be summarized as follows:

When the internally toothed wheel 21 is held fast by the tension of a spring (not shown) for each revolution of the central shaft 1, there is obtained a rotation of 1/12 revolution of the toothed wheels 30 which are fixed on the buttons 43. This results from the operation of the button gear train. Arranged at the end of the shaft 25 is a cam 31 which is fixed to this shaft and which turns exactly like the buttons. In order better to understand the operation, it is to be noted that when the eccentric 16 makes one revolution, the plate 20 makes $$\text{one revolution}\times\frac{72\text{ teeth}}{66\text{ teeth}}\times\frac{4\text{ teeth}}{4\text{ teeth}}=1\text{ revolution}+\frac{1}{11}\text{revolution}$$

Consequently, the toothed wheel 22 turns by 1/11 revolution relatively to the device in a direction opposite to the eccentric 16.

*Dial gear train operation*

Previously, it was assumed that the internally toothed wheel 21 was kept stationary. Let us now suppose that the button gear train is kept stationary.

When the eccentric 16 turns and when the plate 20 (Figure 8) is kept stationary, the internally toothed wheel 21 is obliged to turn in a counter clockwise direction, overcoming the counteracting tension of the spring which is not shown but has already been referred to. Under these conditions, the rotation of the internally toothed wheel 21 is exactly similar to the rotation of the internally toothed wheel 8 previously described, that is to say, it turns in the ratio of 1/12 revolution for 1 revolution of the eccentric 16. The internally toothed wheel 21 is fixed to a toothed wheel having an external toothing 21′ (Figs. 2 and 4), which also has seventy-two teeth. The toothed wheel 21′ transmits its rotation by way of a toothed idler wheel 32 to a toothed wheel 33 which also has seventy-two teeth. The toothed wheel 33 drives a drum 34 on which is wound a cable 34′ which is likewise wound on a drum 35 secured to a toothed wheel 36. The toothed wheel 36 meshes with a toothed wheel 37 which has the same number of teeth as the former. The toothed wheel 37 drives a cam 38 which cooperates with a pawl 39 (Figure 13) fixed to an arm 40 connected to the telephone instrument dial. This arm 40 carries a finger 41 (Figure 2) which is engaged in the zero hole of the telephone instrument dial 41′. It follows that the rotation of the eccentric 16, in the case where the rotation of a button 43 is stopped, transmits the rotation to the internally toothed wheel 21 in the ratio of 1/12 revolution per revolution of the eccentric 16 and that the telephone dial turns in the same ratio.

In order better to understand the operation it is sufficient to know that when the eccentric 16 turns one revolution, the plate 20 which is immovable relatively to the device nevertheless turns one revolution relatively to the eccentric. Likewise, the wheel 21 turns $$1\text{ revolution}\times\frac{4\text{ teeth}}{4\text{ teeth}}\times\frac{66\text{ teeth}}{72\text{ teeth}}=\frac{11}{12}\text{revolution}$$

that is to say, 1/12 revolution, relative to the device in the same direction as the eccentric 16 and the shaft 1.

*Motor and timing controls*

Let us consider only one of the functions of the button, that is to say, its operation of a switch to close the motor energizing circuit and the general timing of the device. Its effect on the automatic dialing of the telephone number at the telephone instrument dial will be hereinafter explained.

Figure 1:
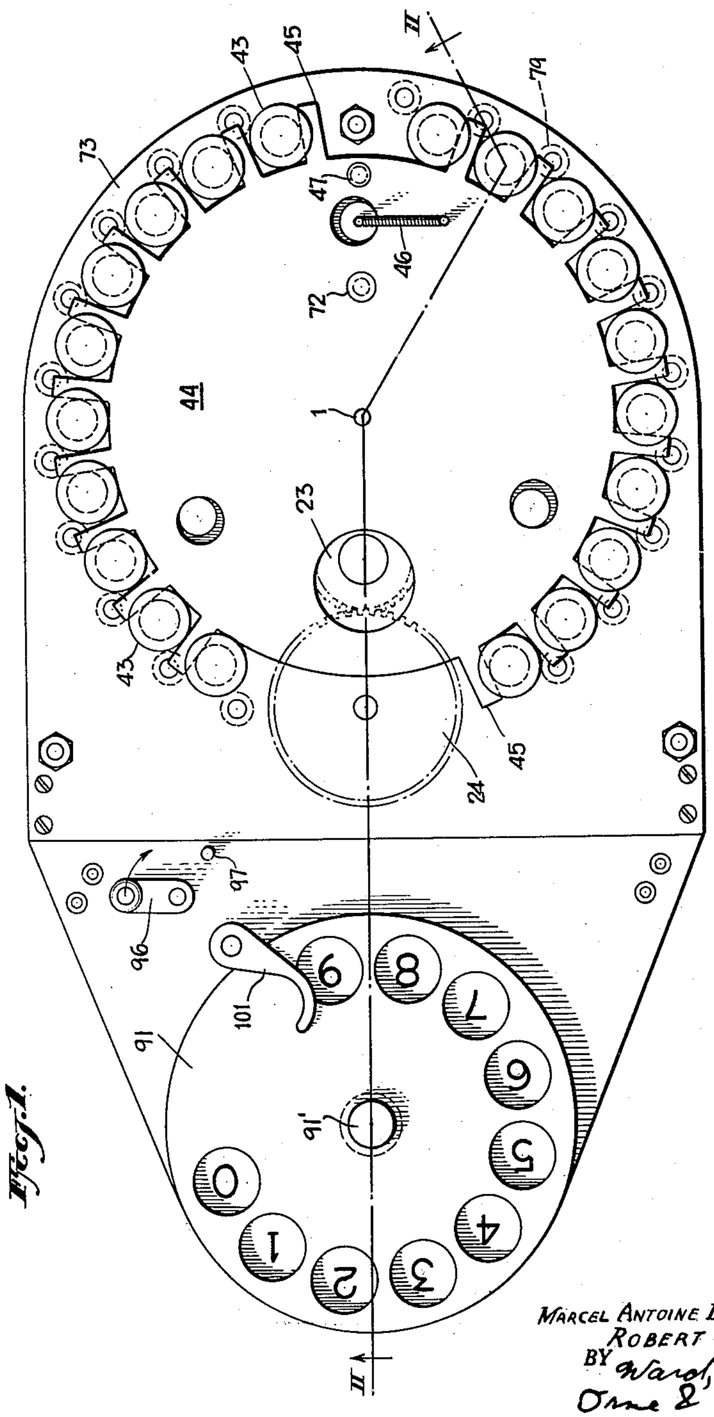
Figure 1:
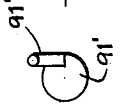

When a button 43 (Figure 2) is depressed, an inclined portion 43*a* acts on lugs 45 of a plate 44 (Figure 1) which serves to operate a switch for energizing the motor 200 and urges this plate 44 against the action of a spring 46 in a clockwise direction (Figures 1 and 2). This movement is produced only when the button reaches its lowest position, and until this time, no switching operation results therefrom. It is only when the button 43 is released and the latter is able to rise again in such manner that the inclined portion 43*a* is no longer acting on the lugs 45 of the plate 44 and permits this plate to return to the position of the drawing that the motor 200 is energized. Consequently, the motor 200 is not able to start as long as a downward pressure is exerted on a button 43. The switch plate 44 is provided with a rod 47 (Figures 1, 2, 6 and 7). In its first movement, the rod 47 slightly moves an arm 48 (Figs. 6 and 7) in such manner that a rod 49 carried by this arm is able to be gripped by a pawl 50 which is subject to the pull of a spring 51. When the arm 48 returns to the position of the drawing, the pawl 50, which is articulated on the plate 52, turns the plate 52 in a counter clockwise direction. When the plate 52 turns in a counter-clockwise direction, an actuator rod 53 of a switch 54 is freed and the motor energizing circuit is closed. At the same moment, a hook 55 on the plate 52 releases a rod 56 carried by an arm 57 and enables the latter to be displaced in a clockwise direction under the action of a spring 58 which is attached to a lever 59 articulated about a pivot 60 carried by the arm 57. The rod 56, in the position of Figure 6, acts on the end of a pawl 61. After the rod 56 is displaced from the path of the pawl 61, the latter, which is under the action of a torsion spring 62 (Fig. 7) has the tendency to turn in a counter-clockwise direction and at the first opportunity engages a cam 63 which is driven by the motor 200, which is turning at this instant. This in turn causes the plate 2 and the shaft 1 to rotate.

The pawl 61 is pivoted on a plate 2 fixed to the central shaft 1 (Fig. 2'). After twelve revolutions of the central shaft 1, the cam 12 (Figs. 2, 6 and 7) has returned to the initial position. As will be hereinafter explained, the effect of this is to also position the rod 56 in the starting position in such manner that the end of the pawl 61 remains secured to this rod 56, and is disconnected from the driving cam 63. As the pawl 61 is locked against rotation in the clockwise direction by a rod 64 fixed to the plate 2, the end of 61 remains engaged with the rod 56 which, by means of the pawl 61, stops the rotation of the plate 2 and of the central shaft 1.

As will be hereinafter explained, the return of the telephone instrument dial to its initial position enables the rod 56 to shift towards its inoperative position. The pawl 61 is then free once more to engage the driving cam 63 at the first opportunity. After this engagement, the plate 2 and the shaft 1 again turn for twelve revolutions. After this has been produced nine times for an apparatus which must be able to accommodate telephone numbers having nine digits, a finger 65 (Fig. 6) which has turned step by step, as will be explained hereinafter, strikes the end of the pawl 50 and unlatches the latter from the rod 49. This frees the plate 52 to which the pawl 50 is pivoted, and because of the spring 52', the plate 52 pushes the rod 53 of the switch 54, which shuts off the motor current. At the same moment, the hook 55 of the plate 52 secures the rod 56 in the position shown in Figure 6.

The means for moving the finger 65 is shown in Figure 9. The finger 65 is fixed on a small pivot shaft 66. Fixed to the same pivot shaft 66 is a toothed wheel 67 having nine teeth. When the internally toothed wheel 8, which is provided on its periphery with one tooth 68, starts one revolution, the toothed wheel 67 advances by half a tooth and is held in this position by a spring 69 which is then engaged between two teeth.

When the internally toothed wheel 8 completes one revolution, the toothed wheel 67 is advanced by the distance of another half tooth, so that the toothed wheel 67 is advanced by one tooth for each revolution of the internally toothed wheel 8. After nine revolutions of the internally toothed wheel 8, the toothed wheel 67 and the finger 65 therefore return to the position shown in Figures 6 and 9. It is during the last rotation by half a tooth that the finger 65 releases the pawl 50 by striking the end of the latter.

The operation of the setting cams 12 and 31 and the levers 57 and 59, all of which are shown in their different positions in Figures 10, 11 and 12, will now be explained in further detail.

It has been explained in connection with the operation of the setting gear train how the cam 12 makes one revolution for twelve revolutions of the central shaft 1. It has also been explained by reference to the operation of the button gear train how the buttons turn by $\frac{1}{12}$ revolution for one revolution of the central shaft 1.

It has also been seen in connection with the operation of the dial gear train that when the rotation of a button 43 is stopped, the telephone instrument dial 41' starts to turn and continues to rotate during the whole of the time that the central shaft 1 turns the number of revolutions which it has yet to make after the moment of stopping the depressed button 43 in order to have completed twelve revolutions from the time it commenced its rotation. This signifies that after twelve revolutions of the central shaft 1:

(1) The cams 11 and 12 (Figure 5) have returned to their initial positions;

(2) The button 43 which has been stopped from turning remains in the position in which it has been stopped in such manner that the cam 31 which exactly follows the rotation of the buttons remains in this position;

(3) The telephone instrument dial 41' remains in the position to which it has been turned by the finger 41.

However, when the cam 11 has returned to its initial position (Figure 5), the stop plate 13 returns to its initial position and the projections 14 free the buttons for rotation.

It is not to be overlooked that the dial 41' wishes to reassume its initial position under the action of a spring and the same applies as regards the internally toothed wheel 21, which is under the action of a spring (not shown). It follows that when the dial 41' returns to its initial or rest position, the buttons will have made one complete revolution, the dial 41' during its return movement driving the buttons for the complementary twelfths of a full turn which is equal to the number of twelfths the dial 41' has turned.

Figure 6:
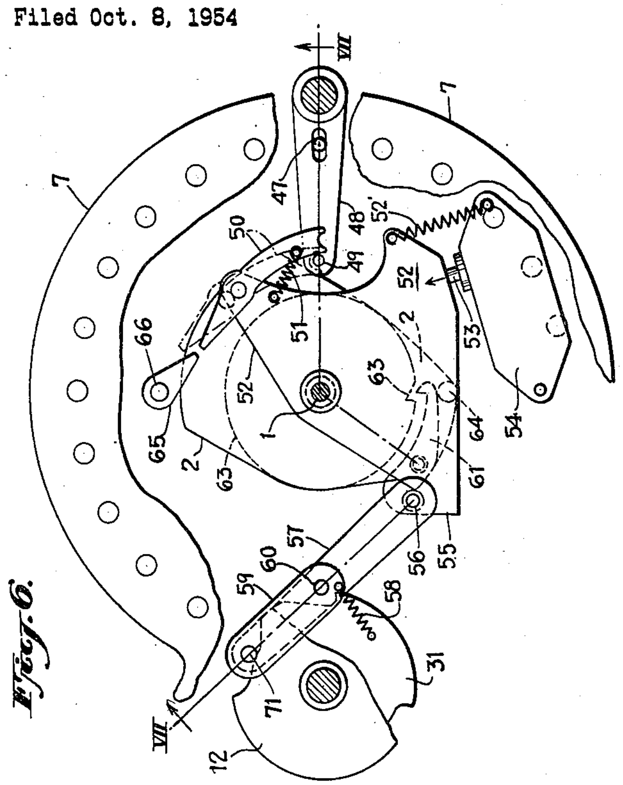
Figure 6 is a horizontal cross-sectional view of the switching and setting mechanisms forming part of the device of the invention.

The cams 12 and 31 are then both in the position of Figure 6 and of Figure 10.

It is possible to summarize the movements of the above-described cams 12 and 31 in the following manner:

For twelve revolutions of the central shaft 1, the cam 12 completes exactly one revolution. The cam 31 makes exactly the same number of twelfths of revolutions as the button which is stopped. When the button is freed for turning movement at the end of twelve revolutions of the central shaft 1, the cam 31 completes its revolution while the dial 41' is returning to its initial position. This means that the cam 31 is only at its initial position when the dial 41' is in its initial or rest position.

It is now possible to follow the action and the disposition of the arms 57 and 58. It has been seen that when, after the complete depression of one button 43, the latter is released, the plate 52 operates the switch 54 and releases its hook 55. As the cams 11 and 31 are then in the position shown in Figures 6 and 10, the pivot 60 moves from the position of Figure 6 to the position of Figure 10, where it bears on the cam 31. In this position of the arm 57, the pawl 61 (Figure 6) is free to operate and the rotation of the central shaft 1 commences. The cams 12 and 31 also become operative. The action of the cam 12 is to cause the lever 57 to turn in a clockwise direction about its pivot 60 because of a rod 70. The action of the cam 31 is to cause the lever 59 to turn in a counter-clockwise direction about a pivot 71 on which the said lever is pivoted by shifting the pivot 60. The clockwise rotation of the lever 57 and the counter-clockwise rotation of the lever 59 are such that they leave the rod 56 in an inoperative position (Figure 11). Just before the twelve revolutions of the shaft 1 are completed, the cam 12 causes the pivot 71 to return to the position of Figure 12, which brings the rod 56 into an operative position and engages the pawl 61 at the end thereof. The result of this is to disconnect the central shaft 1 from the motor 200 and to stop the same.

As soon as the dial has returned to its initial position, the cam 31 also reaches its initial position and the pivot 60 then occupies the position shown in Figure 10 which again brings the rod 56 to the inoperative position and allows the pawl 61 to re-establish the connection of the central shaft 1 to the motor. As a result, a fresh cycle of operations commences.

It has been seen that the finger 65 (Figure 6) frees the pawl 50 at the end of nine cycles, and this causes the plate 52 to return to its initial position in which the switch 54 is open and the rod 56 is held by the hook 55 until the following operation. This is produced at the end of nine cycles and before the dial returns to its initial position, this explaining how the pivot 60 may be in the position of Figure 6, where the cam 31 is shown in its initial position.

*Manual dialing*

When it is desired to dial a telephone number which is not recorded on one of the twenty buttons 43, a dial 91 (Figs. 1 and 2) is operated manually. The manual operation of the dial does not interfere with the automatic dialing device because of the following precautions: the hooked pawl 39 (Figures 2 and 13) pivots at 92 on the arm 40. The said pawl 39 is urged in a counter-clockwise direction by a spring (not shown) but a stud 93' carried by a lever 93 prevents the hooked pawl 39 from entering a notch 38' in the cam 38. As soon as the arm 40 is set in rotation by the dial 91, the pawl 39 slides on the periphery of the cam 38 without affecting the dial gear train. When the dial 91 is restored to its initial position the hooked pawl 39 again occupies the position shown in Figure 13.

*Operation of buttons*

When it is desired to initiate an automatic call, the top of the corresponding button 43 is depressed to its fullest extent. Owing to this fact, the toothed wheel 30 of this button slides along the toothed rod 29 (Fig. 2) and remains in mesh with the train of gears of the buttons. It has been seen that when the button 43 is released, the motor 200 is started. During the depression of the button 43, a small spring 78 (Figs. 2, 14, 22, and 24) which is fixed between the plates 81 and 89 at a point 90 (Figs. 21, 22 and 23) is subjected to a series of compressions toward the axis of the button 43 in the direction of the arrow X of Fig. 22, while it slides along tracks formed in an escapement bar 79. When the button is in its bottom position (Fig. 24), the spring 78 is in a horizontal plane. When the button is released, it moves upwardly again under the thrust of the spring 80 until the spring 78 reaches the bottom step of the escapement bar 79. The spring 78 then bends until it is stopped by the plate 89, which thus urges the spring 78 against the lower part of the bottom step. It has previously been seen that the button 43 has completed one revolution after the dial 41' has returned to its initial position, this happening exactly when the dial 41' reaches this position. During the rotation of the button 43, the plate 89 remains under the bottom step of the escapement bar 79 until the revolution is completed although the spring 78 becomes disengaged from the bar 79. At this moment, the plate 89 shows a recess 94 (Figs. 23 and 26) facing the escapement bar 79 so that the button may rise under the action of the spring 80. It is because of this recess that the button may be depressed when it is in its initial position. The spring 78 which, during the rotation of the button, leaves the escapement bar 79, becomes re-established in the horizontal position, and when the recess 94 is opposite the escapement bar 79 the spring 78 is below the second step from the bottom. However, the spring 78 bends under the action of the spring 80 and when the spring 78 comes into contact with the plate 89, the latter is raised by one step.

This escapement mechanism operates until the depressed button 43 reaches the position shown in Fig. 2. For each step of the escapement bar 79, the successive button stops 15 come successively opposite the projection 14 of the stop plate 13 (Figs. 2 and 5). It is known that the stopping of a button 43 sets the gear train of the dial drive in operation and that the button completes one revolution with the return of the dial, and consequently, at the end of each revolution, the depressed button 43 rises to the next higher level, as has just been explained. The dial 91 is mounted freely on its shaft 91' (Fig. 1') and drives shaft 31' by means of a pawl 91'' articulated on the dial 91. As a result, the visible dial 91 remains stationary during the automatic calling of a number.

*Dial drive*

Let us now examine what is the connection of the dial gear train to the dial, and for this purpose particular reference is made to Figs. 2 and 13. When the cam 38 at the end of the gear train of the dial turns in a clockwise direction, it moves the hooked pawl 39 and consequently the arm 40 of the dial drive. When the dial 41' moves in the reverse direction, and consequently also the arm 40 of the dial drive and the hooked pawl 39, it may be that the cam 38 belonging to the dial gear train, which is under the action of a return spring, would have a tendency to return more quickly than the telephone dial 41'. In this case, the pressure between the pawl 39 and the cam 38 is relaxed and the pawl 39 enters the notch 38' of the cam 38. This makes the telephone dial 41' turn with the dial gear train until the said dial reaches its initial position, where the pawl 39 is once again freed by the stud 93'. In this manner, it is impossible for a fresh cycle to start until the dial 41' has returned because the train of gears of the dial drive and the dial itself are fast with one another until the dial 41' returns to its initial position.

*Setting of buttons*

In order to set a button so that it will cause dialing of a selected telephone number, a small lever 96 (Figs. 1 and 13) is turned in a clockwise direction until it reaches a stop 97. This causes a turning movement of a quarter of a revolution of an eccentric 98 which is fixed on the same shaft as the lever 96. This opens the electric contact between a boss 99 fixed on the lever 93 and a spring 100 and breaks the motor circuit so that no driving action is produced when a button 43 is depressed. The rotation of the lever 93 also moves the stud 93' on the end of the pawl 39, which immediately enters the notch 38' of the cam 38 and makes the dial 41' and the gear train of the latter (and consequently the gear train of the buttons) fast with one another. A locking rod 72 is then introduced through the upper frame plate into the hole in the large central toothed wheel 28. The head of the button 43 is then unscrewed a small amount. Immediately afterwards, the locking rod 72 is removed. The rod 72 has been introduced in order to lock the entire system against rotation while the head of a button is loosened. The assembly of one button is shown in Figs. 14 to 25.

It is to be noted that seven holes are provided in the central toothed wheel 28. This has been done in order that with each complete revolution of the toothed wheel 30 (which has twelve teeth) of one button 43, the central toothed wheel 28 (which has eighty-four teeth) advances by twelve teeth.

After nine revolutions of the toothed wheel 30 of a button 43, the toothed central wheel 28 has advanced by 108 teeth, that is to say, 84 teeth plus 24 teeth. In other words, the toothed central wheel 28 advances by 24 teeth, starting from its original position, after a number has been effected. Therefore, as there are seven holes at equal distances from one another, they are placed every twelve teeth and it is always possible for the locking rod 72 to be fully inserted.

It is also to be noted that the setting of a button to a number comprising less than nine digits will be hereinafter explained.

Figs. 17–20 show a button rod **43*b* comprising a lower cylindrical portion, a central hexagonal portion and an upper threaded portion. Between a fixed ring 74 (Fig. 14) and the threaded cap 43, there are arranged alternately a friction washer 76 (Fig. 16) which has a hexagonal hole and is not able to turn on the button rod 43*b*, a button stop 15 (Fig. 15) which is again followed by another friction washer 76, and so on until in all there are obtained nine button stops and nine friction washers. Situated above this stack of button stops and friction washers is a collar 77, and a toothed wheel 30 which has a hexagonal hole and consequently is not able to turn with respect to the button rod. This whole arrangement has arranged above it a button member 43 which, when it is unscrewed, frees the button stops 15** which are rotable on the button rod.

Let it be supposed that the button is fully depressed. During the depression of the button, the small circular spring 78 shown in Figs. 14, 22 and 24 is subjected to a series of compressions towards the centre in order to enable it to pass the steps of the escapement bar 79. When the button is fully depressed, the spring 78 is in the position of Fig. 24 relatively to the escapement bar 79. When the pressure on the button is relieved, the latter rises under the action of the spring 80 until the small spring 78, which is riveted between the plates 81 and 89 (Figs. 21 and 23) at the point 90, bends downwardly at the instant when it is stopped by the bottom step of the escapement bar 79. In this position, the upper button stop is disposed in the plane of the stop plate 13 (Fig. 2). The operation of the escapement mechanism has previously been described.

The highest of the button stops 15 is maintained in the same plane as the corresponding projection 14 of the stop plate 13 (Figs. 2 and 5). When the first digit of the number to be formed is initially composed by the dial 91, the button 43 turns backwards. When the finger of the operator reaches a finger stop 101, an arm 102 (Fig. 13) which is connected to it and to which is fixed the boss 99 forming an electric contact, turns in a counter-clockwise direction until it is stopped by the eccentric 98 (which has previously turned a quarter of a revolution in a clockwise direction). The spring 100 again touches the contact 99 and the motor 200 starts. While the motor is turning, the operator keeps his finger in the dial in such manner as to lock temporarily the gear train of the dial. The button turns, travelling back (in a counter-clockwise direction) through the same angle as the dial has turned in the forward direction. Let it be assumed for a moment that there is not any button stop 15 which is able to contact a projection 14. As soon as the motor 200 starts, the button 43 turns for one complete revolution in a clockwise direction, because the gear train of the dial is immobilized by means of the operator's finger in the dial 91. Even when the dial 91, instead of being fixedly mounted on its shaft 91', is mounted on the latter by means of a pawl 91'', the dial gear train is kept immobile in one direction by the finger and in the other direction by the tension of the gear train of the dial.

As the button has made one complete revolution in a clockwise direction, a button stop 15 has been stopped by a projection 14 and is held against it until the completion of the turning of the button 43. At this moment, the plate 13 belonging to the setting and switching gear train returns to its position shown in Fig. 5. The projection 14 is then outside the path of the first button stop 15. If now the operator releases the dial, the button turns in a clockwise direction by as many twelfths as travelled by the dial 91 in returning.

Let it now be assumed that the operator placed his finger in the hole of the dial 91 marked with the digit 5 and turned the dial 91 until his finger struck the stop 101. When the dial 91 returns to its original position, the button 43 and the button stop 15 advance in a clockwise direction, starting from the position of Fig. 5, for 5/12 revolution. Consequently, when this button stop 15 will subsequently be locked in this position by tightening the head of the button on the button rod, it will first of all advance by 7/12 revolution and then it will cause the telephone dial to advance by 5/12 revolution, this corresponding to that which had initially been formed. That which has been explained for the first button stop 15 may be repeated for the other button stops 15. When the button reaches the position of Fig. 2, the operator tightens the head of the button 43, which locks all the button stops 15 in their set positions.

It is clear that during the tightening of the head or cap on the button rod **43*b*, it is necessary to insert the locking rod 72 in order to lock the gear train of the buttons. After the setting of the button or buttons, it is also necessary to return the small lever 96** to its position shown in Fig. 13 and then everything is ready for automatic dialing.

When the dial 91 of the device is turned in the clockwise direction during the setting of a number, the button 43 turns in the reverse direction. The small spring 78 is straightened, and when the button 43 commences its rotation in the clockwise direction under the action of the motor 200, a premature change of lever may be feared when the small spring 78 again passes in front of the escapement bar 79. However, this is not produced, because the stop plate 13 is then engaged between two friction washers 76 of the depressed button 43.

In order to permit the driving of the motor shaft by the motor at the time of the setting of a button 43, the cam 31 remains immovable while the finger is driving the dial 91 owing to the fact that the cam 31 is connected to its shaft 25 by a pawl **31*a* pivoted to it. This cam 31 remains immovable as long as the recess in the shaft 25 does not receive the pawl 31*a* of the cam 31**.

Let us now examine how it is possible to record and initiate an automatic call of a number having fewer than nine digits.

Let it be supposed that it is desired to record a number having three digits. These three digits are set on a button 43 in the manner hereinbefore described. The dial 91 of the device is then kept stationary in its initial position while the finger stop 101 is pressed. This causes the motor 200 to turn. The button 43 makes one revolution and leaves its button stop 15 against the projection 14 of the plate 13 until the latter is withdrawn. The button 43 jumps to the following level, and as the dial is being held stationary and the finger stop 101 is pressed, the motor 200 starts another rotation of twelve revolutions and causes the button 43 to make another revolution. At the end of this revolution, the button stop 15 is once again in the position of Fig. 5 etc. When the button 43 is locked and the lever 96 is restored to its position shown in Fig. 13, all is ready for an automatic call.

When the last-mentioned button 43 is then depressed, the device first dials the three digits. The following button stop 15 is not stopped by its projection 14, because the latter is retracted just at the moment when the button stop 15 reaches it at the end of the rotation of the button. When a fresh revolution of the button commences, the button stop 15 is retracted from the path of a projection 14 just when this latter reaches its stop position. It is therefore clear that the button is not stopped and consequently the dial does not turn.

When at the end of nine cycles of operations, the hook 55 of the plate 52 reaches the position of Fig. 6 in order to engage the rod 56, this latter would be out of the path of the pawl 61 if no precautions had been taken. Actually, the cams 12 and 31 are returned to their initial position at the same instant in the case where the button is not stopped. For this purpose a notch in the cam 12 is such that the rod 70 (Figs. 10, 11 and 12) enters the notch slightly before the pivot 60 is able to enter the notch of the cam 31 and the finger 65 (Fig. 6) strikes the end of 50 at the same moment so that the plate 52, and consequently the hook 55, advances just in time to engage the rod 56. Thus, when the notch of the cam 31 reaches the position of Figures 6 and 10, the pivot 60 is no longer able to enter the said notch because it is secured. Despite this premature engagement, the twelve revolutions of the shaft 1 may take place, because the disconnection between the motor and the shaft 1 is only produced when the end of the pawl 61 strikes the rod 56.

Fig. 2'' shows a differential mechanism which may replace a part of the mechanism Shown in Fig. 2. The assembly of the elements 1'', 3'', 4'', 5'', 6'', 7'', 8'', 8'''', 16'', 17'', 18'', 19'', 20'', 21'', 21'''' may replace the assembly 1, 3, 4, 5, 6, 7, 8, 8', 16, 17, 18, 19, 20, 21, 21' of Figure 2. The frame 7'' is similar to the frame 7 but does not contain the four holes 6. Moreover, a wheel having sixty-six teeth forms a part of the frame.

Keyed to the shaft 1'' is an eccentric 16'' driving a planet wheel 17''. The latter comprises, on the one hand, sixty teeth 18'' meshing with sixty-six teeth 19'' of the wheel 20'' and, on the other hand, thirty teeth meshing with thirty-six teeth on the wheel 21''. The wheel 20'' rotates with the toothed wheel 22. The wheel 21'' carries the toothing 21'''' consisting of seventy-two teeth which mesh with the idler wheel 32. Keyed to the shaft 1'' is an eccentric 3'' driving a planet wheel 4''. The latter comprises, on the one hand, sixty teeth 5'' meshing with sixty-six teeth 6'' held by the frame 7'' and, on the other hand, thirty teeth meshing with thirty-six teeth of the toothed wheel 8''. The teeth 8'' are on the wheel 8'''' having seventy-two external teeth which mesh with the idler wheel 9.

It will be seen that, just as with the replaced elements, the mechanism meshes with the freely mounted wheels 9 and 32 and that when the shaft 1'' makes a revolution, the cam 12 makes 1/12 revolution. If this shaft 1'' makes one revolution and if the dial 41' remains stationary the button 43 makes 1/12 revolution. If the shaft 1'' makes one revolution and if the button 43 remains stationary, the dial makes 1/12 revolution. Finally, if the shaft 1'' remains stationary and if the dial 41' turns by 1/12 revolution, the button 43 also makes 1/12 revolution.

Figure 2'' shows another differential mechanism which may replace a part of the mechanism shown in Fig. 2. The assembly of the elements 1''', 4''', 7''', 8''', $8^v$, 17''', 20''', 21''', $21^v$, may replace the assembly 1, 3, 4, 5, 6, 7, 8, 8', 16, 17, 18, 19, 20, 21, 21', of Fig. 2. This differential mechanism may employ a motor 200 turning in the same direction as the motor 200 which drives the elements in Fig. 2, provided that there are omitted one intermediate wheel in the dial train, one intermediate wheel in the button train and one intermediate wheel in the cam train. Its operation then does not differ from the operation with a motor 200 of the reverse direction of rotation which it is assumed is used in the explanation which follows.

The frame 7''' is similar to the frame 7 except that it does not comprise the four holes 6 and that the shafts of the wheel 4''' are mounted on the frame 7'''. The satellite gears 17''' have thirty-three teeth and mesh, on the one hand, with six teeth on the shaft 1''' and, on the other hand, with seventy-two teeth of the internally toothed wheel 2'''. The latter is integral with the wheel $21^v$ which has 72 teeth meshing with the idler wheel 32. The satellite wheel 4''' having thirty-three teeth mesh with six teeth in the shaft 1''' and with the seventy-two teeth of the internally toothed wheel 8''' on the wheel $8^v$. The latter has seventy-two teeth which mesh with the idler wheel 9.

The shafts of the satellite gears 17''' are mounted on the wheel 20''' secured to the wheel 22' which has seventy-eight teeth (instead of the sixty-six teeth in the case of Fig. 2).

It will be seen that just as with the elements which have been replaced, the mechanism meshes with the idler wheels 9 and 32 and that when the shaft 1''' makes one revolution, the cam 12 makes 1/12 revolution. If this shaft makes one revolution and if the dial 41' remains stationary, the button 43 makes 1/12 revolution. If the shaft 1''' makes one revolution and if the button 43 remains stationary, the dial 41' makes 1/12 revolution. Finally, if the shaft 1''' remains stationary and if the dial 41' turns by 1/12 revolution, the button 43 also makes 1/12 revolution.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What is claimed as new and desired to be secured by Letters Patent of the United States is:

1. A dialing device comprising dial operating means, a call-initiating key; a control mechanism operable by said key; a key gear train for driving said control mechanism, a dial gear train for driving said dial operating means, and common motor means for driving both said gear trains, said control mechanism comprising means for connecting said motor means with said key gear train for driving the latter and for thereby operating said control mechanism, for alternately connecting said motor means with said dial gear train for driving the latter and for thereby driving said dial operating means and for interconnecting said dial gear and said key gear trains for driving said key gear train by said dial gear train.

2. A dialing device comprising dial operating means, a call-initiating key, a control mechanism operable by said key, a key gear train for driving said control mechanism, a dial gear train for driving said dial operating means, and common motor means for driving both said gear trains, said control mechanism comprising means for first connecting said motor means with said key gear train for driving the latter and for thereby operating said control mechanism, and then connecting said motor means with said dial gear train for driving the latter a predetermined distance away from a rest position and for thereby driving said dial operating means a predetermined distance and for subsequently interconnecting said dial gear and said key gear trains for driving said key gear train by said dial gear train during return of said dial gear train to its rest position.

3. A dialing device comprising dial operating means, a call-initiating key, a control mechanism operable by said key, a key gear train for driving said control mechanism, a dial gear train for driving said dial operating means, and motor means for driving said gear trains, said control mechanism comprising means for first connecting said motor means with said key gear train for driving the latter a predetermined distance and then connecting said motor means with said dial gear train for driving the latter away from a predetermined rest position a distance which is complementary to said predetermined distance and for subsequently interconnecting said dial gear and said key gear trains for driving said key gear train by said dial gear train during return of the latter to its rest position.

4. A dialing device comprising dial operating means, a call-initiating key, a control mechanism operable by said key, a key gear train for driving said control mechanism, a dial gear train for driving said dial operating means, motor means for driving said gear trains, said control mechanism comprising means for first connecting said motor means with said key gear train for driving the latter a predetermined distance and then connecting said motor means with said dial gear train for driving the latter away from a predetermined rest position a distance which is complementary to said predetermined distance and for subsequently interconnecting said dial gear and said key gear trains for driving said key gear train by said dial gear train during return of the latter to its rest position, and means for setting said control mechanism comprising means for disabling a portion of said control mechanism and for temporarily preventing driving of said control mechanism by said motor means upon depression of said key, a second dial for driving said dial gear train and for thereby driving said key gear train, means operated upon movement of said second dial a predetermined distance to operate said motor means and for thereby driving said key gear train and said control mechanism, said control mechanism, after movement thereof a predetermined distance, stopping said motor means and permitting said dial gear train to drive said key gear train during return of the dial gear train to its rest position.

5. An automatic dialing device comprising: a first shaft; a finger drivingly connected with said shaft and in for rotation of the latter; a differential gear system; means drivingly interconnecting one portion of said differential gear system and said shaft; a movable and depressible key having an adjustable stop thereon; interconnecting sertable in a finger hole of a telephone instrument dial means drivingly interconnecting said key and another portion of said differential gear system for moving said key by said first means; motor means; clutch means for interconnecting said motor means and a third portion of said differential gear system; switch means operable by said key in its depressed position and connected to said motor means for energization of the latter; first cam means operable by said motor means and movable into the path of movement of said stop in the depressed position of said key and for thereby stopping the movement of said depressed key and said other portion; second cam means operable by said motor means for operating said clutch means after a predetermined amount of movement of said one portion to disconnect said motor means and said one portion; third cam means operable by said interconnecting means for operating said clutch means in a predetermined position of said finger to connect said motor with said one portion; and fourth cam means for operating said switch upon return of said key to its undepressed condition and for thereby de-energizing said motor means.

6. An automatic dialing device comprising a first shaft; a finger drivingly connected with said shaft and insertable in a finger hole of a telephone instrument dial for rotation of the latter; a differential gear system comprising a first gear, a second gear in engagement with said first gear and first means rotatable by said first gear; means drivingly interconnecting said first gear and said shaft; a movable and depressible key having an adjustable stop thereon; interconnecting means drivingly interconnecting said key and said first means for moving said key by said first means; motor means; clutch means for interconnecting said motor means and said first gear for movement of the latter; switch means operable by said key in its depressed position and connected to said motor means for energization of the latter; first cam means operable by said motor means and movable into the path of movement of said stop in the depressed position of said key and for thereby stopping the movement of said depressed key and said first means; second cam means operable by said interconnecting means for operating said clutch means after a predetermined amount of movement of said first gear to disconnect said motor means and said first gear; third cam means operable by said interconnecting means for operating said clutch means in a predetermined position of said finger to connect said motor with said first gear; and fourth cam means for operating said switch upon return of said key to its undepressed condition and for thereby de-energizing said motor means.

7. An automatic dialing device comprising a manually rotatable first shaft; a first dial drivingly connected with said shaft; a finger drivingly connected with said shaft and insertable in a finger hole of a telephone instrument dial for rotation of the latter; a differential gear system comprising a first gear, a second gear in engagement with said first gear and first means rotatable by said first gear; means drivingly interconnecting said first gear and said shaft; a rotatable and depressible key having a plurality of adjustable stops thereon; interconnecting means drivingly interconnecting said key and said first means for rotating said keys by said first means; motor means; clutch means for interconnecting said motor means and said first gear for movement of the latter; switch means operable by said key in its depressed position and connected to said motor means for energization of the latter; first cam means operable by said motor means and movable into the path of movement of a stop on said key in its depressed position and for thereby stopping the rotation of said key and said first means; an escapement mechanism connected with said key for successively positioning said stops so that the path of movement of the stops causes each stop to engage said first cam means in succession; second cam means operable by said interconnecting means for operating said clutch means after a predetermined amount of movement of said first gear to disconnect said motor means and said first gear; third cam means operable by said interconnecting means for operating said clutch means in a predetermined position of said finger to connect said motor with said first gear; and fourth cam means for operating said switch upon return of said key to its undepressed condition and for thereby de-energizing said motor means.

8. An automatic dialing device comprising a manually rotatable first shaft; a first dial drivingly connected with said shaft; a finger drivingly connected with said shaft and insertable in a finger hole of a telephone instrument dial for rotation of the latter; a differential gear system comprising a first gear, a second gear in engagement with said first gear and first means rotatable by said first gear; means drivingly interconnecting said first gear and said shaft; a plurality of rotatable and depressible keys each having a plurality of adjustable stops thereon; interconnecting means drivingly interconnecting said keys and said first means for rotating said keys by said first means; motor means; clutch means for interconnecting said motor means and said first gear for movement of the latter; switch means operable by a depressed one of said keys and connected to said motor means for energization of the latter; first cam means operable by said motor means and movable into the path of movement of a stop on a depressed one of said keys and for thereby stopping the rotation of said depressed key and said first means; an escapement mechanism connected with said depressed key for successively positioning said stops so that the path of movement of the stops causes each stop to engage said first cam means in succession; second cam means operable by said interconnecting means for operating said clutch means after a predetermined amount of movement of said first gear to disconnect said motor means and said first gear; third cam means operable by said interconnecting means for operating said clutch means in a predetermined position of said finger to connect said motor with said first gear; and fourth cam means operable by said motor means for operating said switch upon return of a depressed key to its undepressed condition and for thereby de-energizing said motor means.

9. An automatic dialing device comprising a manually rotatable first shaft; a first dial drivingly connected with said shaft; a finger drivingly connected with said shaft and insertable in a finger hole of a telephone instrument dial for rotation of the latter; a differential gear system comprising a first eccentric, a first gear driven by said eccentric, a second gear in engagement with said first gear and first means rotatable by said first gear; means drivingly interconnecting said first gear and said shaft; a plurality of rotatable and depressible keys each having a plurality of adjustable stops thereon; interconnecting means drivingly interconnecting said keys and said first means for rotating said keys by said first means; motor means; clutch means for interconnecting said motor means and said eccentric rotation of the latter; switch means operable by a depressed one of said keys and connected to said motor means for energization of the latter; first cam means operable by said motor means for moving a projection into the path of movement of a stop on a depressed one of said keys and for thereby stopping the rotation of said depressed key and said first means; an escapement mechanism connected with said depressed key for successively positioning said stops so that the path of movement of the stops causes each stop to engage said projection in succession; second cam means operable by said interconnecting means for operating said clutch means after a predetermined number of revolutions of said eccentric to disconnect said motor means and said eccentric; third cam means operable by said interconnecting means for operating said clutch means in a predetermined position of said finger to connect said motor with said eccentric; and fourth cam means operable by said motor means for operating said switch upon return of a depressed key to its undepressed condition and for thereby de-energizing said motor means.

10. An automatic dialing device comprising a manually rotatable first shaft; a first dial drivingly connected with said shaft; a finger drivingly connected with said shaft and insertable in a finger hole of a telephone instrument dial for rotation of the latter; a differential gear system comprising a first eccentric, a first gear driven by said eccentric, a second gear in engagement with said first gear and first means rotatable by said first gear; means drivingly interconnecting said first gear and said shaft; a plurality of rotatable and depressible keys each having a plurality of adjustable stops thereon; interconnecting means drivingly interconnecting said keys and said first means for rotating said keys by said first means; motor means; clutch means for interconnecting said motor means and said eccentric for rotation of the latter; switch means operable by a depressed one of said keys and connected to said motor means for energization of the latter; first cam means operable by said motor means for moving a projection into the path of movement of a stop on a depressed one of said keys and for thereby stopping the rotation of the said depressed key and said first means; an escapement mechanism connected with said depressed key for successively positioning said stops so that the path of movement of the stops causes each stop to engage said projection in succession; second cam means operable by said interconnecting means for operating said clutch means after a predetermined number of revolutions of said eccentric to disconnect said motor means and said eccentric; third cam means operable by said interconnecting means for operating said clutch means in a predetermined position of said finger to connect said motor with said eccentric; fourth cam means operable by said motor means for operating said switch upon return of a depressed key to its undepressed condition and for thereby de-energizing said motor means; a further switch connected in series with said first-mentioned switch; manually operable means engageable by an operator's finger when in a hole in said first dial for operating and closing said further switch; and manually operable means for opening said further switch and disconnecting said first-mentioned finger from said shaft.

References Cited in the file of this patent

UNITED STATES PATENTS 2,060,371 Hilgers ---------------- Nov. 10, 1936

U. S. DEPARTMENT OF COMMERCE

PATENT OFFICE

CERTIFICATE OF CORRECTION

Patent No. 2,820,106 January 14, 1958

Marcel Antoine Demeulenaere et al.

It is hereby certified that error appears in the printed specification of the above numbered patent requiring correction and that the said Letters Patent should read as corrected below.

Column 4, line 25, for "each rod" read --each rod 5--; column 9, line 65, for "shaft 31′" read --shaft 91′--; column 13, line 43, for "wheel 2‴" read --wheel 21‴--; line 45, for "wheel" read --wheels--; column 15, line 2, strike out "sertable in a finger hole of a telephone instrument dial" and insert the same after "and in-" in line 72, column 14.

Signed and sealed this 1st day of April 1958.

(SEAL)
Attest:
KARL H. AXLINE

Attesting Officer

ROBERT C. WATSON
Commissioner of Patents